United States Patent [19]

van Straaten

[11] 4,228,462

[45] Oct. 14, 1980

[54] LINE OSCILLATOR SYNCHRONIZING CIRCUIT

[75] Inventor: Jan van Straaten, Nijmegen, Netherlands

[73] Assignee: U.S. Philips Corporation, New York, N.Y.

[21] Appl. No.: 960,528

[22] Filed: Nov. 14, 1978

[30] Foreign Application Priority Data

Dec. 19, 1977 [NL] Netherlands ................... 7714033

[51] Int. Cl.³ .................. H04N 5/12; H03L 7/08
[52] U.S. Cl. ............................ 358/158; 331/20
[58] Field of Search ............. 358/158, 159, 148; 331/17, 18, 20

[56] References Cited

U.S. PATENT DOCUMENTS

| 3,991,270 | 11/1976 | van Straaten et al. | 358/158 |
| 4,024,343 | 5/1977 | Cense et al. | 331/20 |

Primary Examiner—John C. Martin
Attorney, Agent, or Firm—Thomas A. Briody; William J. Streeter; Edward W. Goodman

[57] ABSTRACT

A television receiver having a line synchronizing circuit wherein gate pulses for keying the synchronizing signal are derived from the oscillator signal, the gate pulses being positioned, by means of an auxiliary phase control loop, substantially symmetrical relative to an edge of a reference signal also derived from the oscillator signal. The auxiliary control loop also eliminates the influence of phase variations occurring in the line deflection circuit.

6 Claims, 3 Drawing Figures

LINE OSCILLATOR SYNCHRONIZING CIRCUIT

BACKGROUND OF THE INVENTION

The invention relates to a television receiver comprising a line synchronizing circuit and also comprising a line deflection circuit, the line synchronizing circuit comprising a controllable oscillator for generating an oscillator signal applicable to the line deflection circuit and being provided with means for applying a pulse-shaped line synchronizing signal and a pulse-shaped gate, which which is derived from the oscillator signal by means of a pulse generator, to a coincidence stage, an output terminal of which is connected to a first phase discriminator for determining the phase difference between the synchronizing signal and a reference signal which is also derived from the oscillator signal, the line synchronizing circuit being further provided with a first low-pass filter for smoothing the output voltage of the first phase discriminator, the frequency and/or phase of the oscillator being controllable by the first smoother voltage thus obtained, with a second phase discriminator for determining the interval between the center instant of a gate pulse and the center instant of an edge occurring in the reference signal, and with a second low-pass filter for smoothing the output voltage of the second phase discriminator, the center instant of said edge being controllable by means of the second smoothed voltage thus obtained. Such a line synchronizing circuit is disclosed in Applicant's Dutch Patent Application No. 7511633 (PHN.8169). In this known circuit a second phase control loop, which comprises the second discriminator and the second low-pass filter ensures that said two instants substantially coincide so that the gate pulses are substantially symmetrical relative to the edge of the reference signal. Consequently, the gate pulses may be of a very short duration, so that the insensitivity to noise is increased. The output signal of the circuit can be applied to the line deflection circuit ensuring that its phase is fixed relative to that of the received line synchronizing pulses.

It may, however, happen that phase variations occur in the line deflection circuit, for example because the turn-off time of a switch, usually a power transistor, present in said circuit is not constant. In order to reinstate the desired fixed phase relation between the deflection and the received synchronizing pulses, it is proposed in said patent application to apply the output signal of the present circuit first to a phase discriminator in which it is compared in known manner to a signal originating from the deflection circuit. This implies a third phase control loop. Consequently, the synchronizing circuit becomes complicated and more difficult to be implemented in integrated form.

SUMMARY OF THE INVENTION

It is an object of the invention to provide a synchronizing circuit comprising only two phase-controlled loops and, to this end, the receiver according to the invention is characterized by a gate having a first input terminal for receivng the output signal of the pulse generator and a second input terminal for receiving an output signal of the line deflection circuit and having an output terminal for applying the gate pulses thus obtained to the coincidence state and to the second phase discriminator.

DESCRIPTION OF THE DRAWINGS

The invention will be further explained by way of non-limitative example with reference to the accompanying figures in which

In FIG. 1 reference numeral 1 denotes the input terminal of the line synchronizing circuit. Line synchronizing pulses, having the line repetition frequency $f_H$, i.e., for example, 15,625 or 15,750 Hz, are present at the input terminal. These pulses are derived, in known manner in the television receiver, not shown, of which the circuit forms part, from the received signal in a synchronizing-separation stage and are applied to an input terminal of an AND-gate 2. FIG. 2a shows the variation versus the time of these pulses. Herein the symbol $T_H$ denotes the line period, i.e. approximately 64 μs.

FIG. 2b shows the variation of gate pulses which are applied to another input terminal of gate 2 and which are generated in the circuit in a manner still to be explained hereafter. FIG. 2b shows each gate pulse symmetrically relative to the center instant $t_o$ of the corresponding line synchronising pulse of FIG. 2a. As known this pulse has a duration of, for example, 4.5 to 5 μs. The gate pulses have a somewhat longer duration of, for example, 7.7 μs. The output signal of gate 2 is applied to a controllable switch 3. If the pulses at the inputs of gate 2, as in FIG. 2, occur at least partly simultaneously, then switch 3 is made conductive for the duration of that portion of the line synchronizing pulses.

Figure 1:
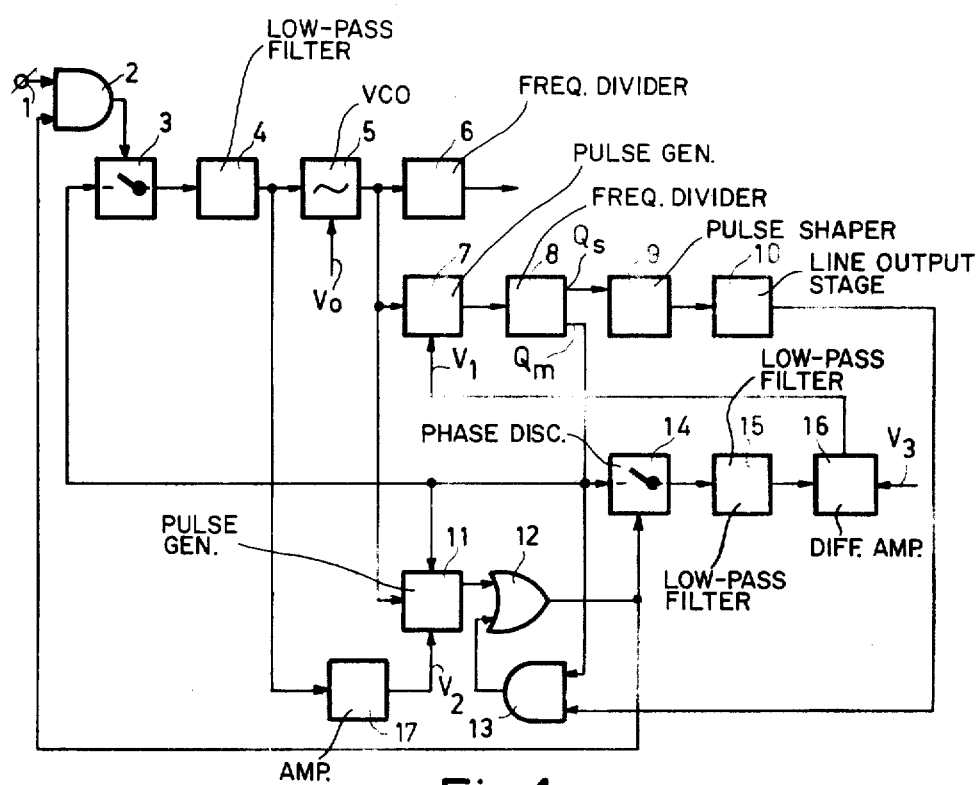
FIG. 1 shows a block diagram of an implementation of a portion of a television receiver according to the invention and FIGS. 2 and 3 show wave forms which may be used therein.

Switch 3 is supplied with a line frequency reference signal which is generated in a manner still to be explained hereafter and which is shown in FIG. 2c. In the synchronized state it has a falling edge at instant $t_o$ and a rising edge at an instant which is, for example, in the center of the time interval between instant $t_o$ and the corresponding instant $t_1$ one cycle later.

In these circumstances the voltage shown in FIG. 2d is present at the output terminal of switch 3. After smoothing by means of a low-pass filter 4, a d.c. voltage is produced which is supplied to a voltage controlled oscillator 5, whose frequency and/or phase is adjusted hereby. Switch 3 behaves as a phase discriminator by means of which the falling edge of the signal of FIG. 2c is adjusted to the center instant $t_o$ of the pulse of FIG. 2a. If the frequency of the signal of FIG. 2c deviates from the value $f_H$, then the phase difference between this signal and that of FIG. 2a varies continuously. The control voltage supplied to oscillator 5 is then an a.c. voltage, namely until the two frequencies are equal again, wherafter the control voltage is a d.c. voltage.

Oscillator 5 is also supplied with a d.c. voltage $V_o$ of, for example, 3 V on which the control voltage just mentioned is superimposed. Voltage $V_o$ may correspond to the nominal frequency of the line synchronizing pulses in accordance with the television standard for which the television receiver is suited. In the described implementation, however, the signal generated by oscillator 5 has, in the nominal case, a frequency $2f_H$ which is double the line frequency. This signal is applied to a frequency divider circuit 6 in which the frequency is divided by the number of lines per picture in the relevant standard, being, for example, 625 or 525. A field frequency signal of, for example, 50 or 60 Hz, is available at an output terminal of divider circuit 6 in the synchronized state of the line phase-controlled loop, which signal can be applied to a field synchronizing circuit of known type.

The sawtooth signal shown in FIG. 3a is derived from the signal of oscillator 5, the sawtooth signal being applied to a pulse generator 7. By means of a d.c. voltage level $V_1$ which is applied to generator 7 and which is generated in a manner still to be explained, the sawtooth signal is converted in this generator into a pulse-shaped signal (FIG. 3b). The leading edges of these pulses and the rising edges in FIG. 3a occur simultaneously; while the instant of occurrence of the trailing edges of the pulses is determined by the value of voltage $V_1$. These pulses are applied to a frequency dividing circuit 8 which, for example, is a binary divider circuit of known type, for example a master-slave flip-flop. The output signals thereof have the line frequency $f_H$. The signal at an output terminal $Q_s$ thereof (see FIG. 3c) changes levels each time a falling edge occurs in the signal of FIG. 3b, while the signal at an output terminal $Q_m$ of circuit 8 (see FIG. 3d) changes levels each time a rising edge occurs in the signal of FIG. 3b. This implies that the signal of FIG. 3b is fixed relative to the time axis while the position of the signal of FIG. 3c depends on the value of voltage $V_1$.

The signal at terminal $Q_m$ is the signal which is applied as a reference signal to switch 3, while the signal at terminal $Q_s$ is applied to a pulse shaper 9. The output signal thereof has the variation which is suitable for being applied, possibly via a driver stage, to a line output stage 10. Stage 10 supplies a line frequency current to the deflection coil, not shown, for the horizontal deflection in the picture display tube. Stage 10 comprises a switch usually a power transistor, whose turn-on time is relatively short, while its turn-off time is considerable, namely in the order of 10 µs. This is caused by the fact that the charge carriers, which are present in an excess in the saturated transistor, must first be removed. As known, the turn-off time depends on variations in the load of stage 10, for example the beam current in the picture display tube. In known manner, the adverse influence of such variations can be compensed for, for example by including a phase-controlled loop between oscillator 5 and the output of stage 10, this loop comprising a phase discriminator, a low-pass filter as well as an oscillator or a phase-shifting network. A signal originating from the output of stage 10 is used as a reference signal for this loop. Dutch Patent Application No. 7103465 (PHN.5499) discloses such a phase-controlled loop. A compensation is effected in the circuit of FIG. 1 in a different manner, which will be explained in the further course of this description.

The sawtooth voltage of FIG. 3a is also applied to a pulse generator 11 in which the sawtooth signal is converted into the pulse-shaped signal of FIG. 3e by means of a d.c. voltage $V_2$ applied thereto. The rising edges thereof occur simultaneously with those of FIG. 3a while the falling edges occur at the instants at which the sawtooth signal attains the value $V_2$. In this manner the frequency of these pulses would have the double line frequency $2f_H$. However, the signal at the terminal $Q_m$ of divider circuit 8 is also applied to generator 11, thus, each rising edge of this signal cuts off generator 11. Other line frequency signals, for example line flyback pulses originating from stage 10, can also be used for this same purpose. The pulses obtained are applied to an input terminal of an OR-gate 12.

FIG. 3f shows line flyback pulses present in output stage 10, for example across a winding of a transformer thereof. For simplicity they are depicted as sine-shaped waves. They occur from approximately the instant at which the switch in stage 10 is switched-off, that is to say a time 96 after the occurrence of a falling edge of signal $Q_s$ (FIG. 3c) which time $\tau$ may be variable, while the duration of these pulses is substantially constant. The pulses of FIG. 3f are applied to an input terminal of an AND-gate 13, while another input terminal is connected to terminal $Q_m$ of the frequencies divider 8. The output terminal of gate 13 is connected to an input terminal of gate 12.

From FIGS. 3d and 3f it appears that the output signal of gate 13 has a leading edge from a time $\tau$ after the occurrence of a falling edge of signal $Q_s$, and a trailing edge at the instant at which a falling edge of signal $Q_m$ occurs. The output signal of gate 12 has a leading edge at the same instant at which the leading edge of the output signal of gate 13 occurs and a trailing edge at the same instant at which the trailing edge of generator 11 occurs. The pulses at the output terminal of gate 12 are shown in FIG. 3g and are the gate pulses of FIG. 2b which are applied to gate 2. The leading edges thereof occur at instants which depend on the delay $\tau$ produced in output stage 10, while the instants at which the trailing edges occur depend only on the, optionally adjustable, voltage $V_2$. These pulses do not contain any information concerning the signal $Q_m$, in spite of the fact that $Q_m$ is one of the input signals of gate 13, which information is, for the rest not necessary. Said input signal is only used for removing the portion of the pulse of FIG. 3f occurring after the falling edge of signal $Q_m$. The same result can be achieved by means of, for example, a bistable multivibrator, the output signal of which has a leading edge at the same instant as the flyback pulse and a trailing edge at the same instant as the signal of generator 11.

A phase discriminator 14, implemented as a controllable switch, is supplied with the reference signal at the output terminal $Q_m$ of divider circuit 8 (FIG. 3d) as well as with the gate pulses originating from gate 12. Switch 14 conducts during the occurrence of the gate pulses and its output voltage is smoothed by a low-pass filter 15.

The smoothed voltage obtained, as well as a d.c. voltage $V_3$, derived from the supply voltage of the circuit, are supplied to a differential amplifier 16. The output voltage thereof is the voltage $V_1$ which is supplied to pulse generator 7. As a result thereof the duration of the pulses of FIG. 3b and, consequently, also the position along the time axis of the edges of signal $Q_s$, depend on the value of the smoothed voltage. Elements 7 to 16 inclusive constitute an auxiliary control loop which operates so that each gate pulse of FIG. 3g remains symmetrical relative to the edge of the reference signal of FIG. 3d and, consequently, also relative to the center instant of the synchronizing pulse of FIG. 2a. This determines the duration of the gate pulse. Since, if the duration of the synchronizing pulse is 4.7 µs while the duration of the flyback pulse is 12 µs and if the interval between the starting instant of the flyback pulse (that is to say that of the blanking pulse in the received video signal) and the starting instant of the synchronizing pulse is equal to 1.5 µs, then the period of time between the leading edge in FIG. 2b and instant $t_o$ is equal, in the ideal case, to $1.5 + (4.7/2) = 3.85$ µs. Due to the action of voltage $V_2$ in stage 11 and of the auxiliary control loop, the trailing edge in FIG. 2b occurs 3.85 μs after instant $t_o$, so that the duration of the gate pulse is 7.7 μs. In practice the pulse will be somewhat longer but it is obvious that, due to this rather short period of time, it is ensured that the sensitivity of the circuit to noise and disturbances is low, which especially holds for disturbances caused by reflection.

The final state of the auxiliary control loop is attained after a time which is independent of the frequency of oscillator 5, while the auxiliary control loop cannot experience an adverse influence from noise and disturbances. The time constant of filter 15 can therefore be chosen at will. Dutch Patent Application No. 7511633 (PHN.8169) describes all this more extensively. Because, however, the variations of delay τ can be rapid, this time constant must be many times smaller, for example ten times as small as that of filter 4.

Figure 2:
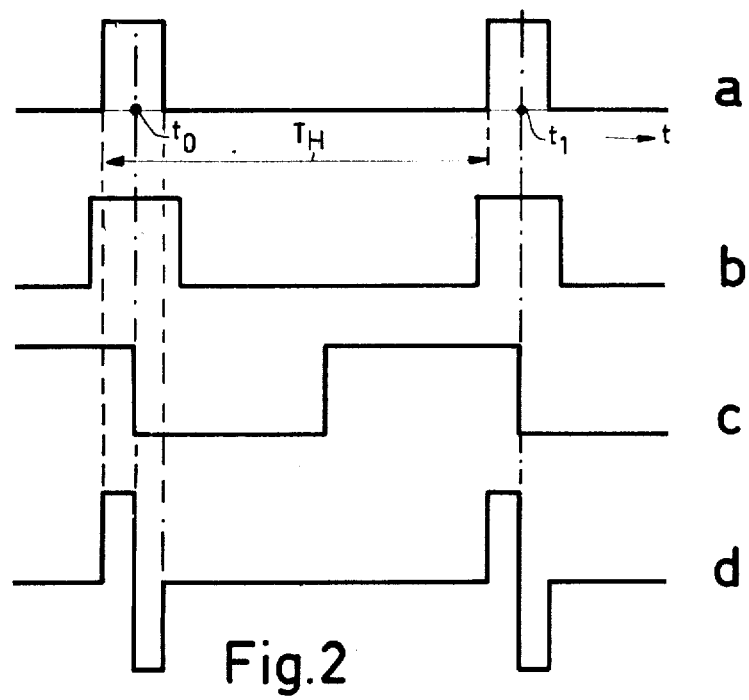

If the frequency of oscillator 5 varies, for example due to a variation in the supply voltage, or if the frequency of the received line synchronisation pulses varies, for example because a switch-over to another transmitter is effected, the oscillator 4 is so adjusted by the operation of the control loop formed by elements 3 to 8 inclusive that the situation indicated in FIG. 2 occurs. This implies that the waveforms of the FIGS. 3a, 3b, 3c, 3d and 3e are shifted along the time axis until the leading edges of the pulses of FIG. 3a occur at the center instants of the synchronizing pulses of FIG. 2a. In this way it is ensured that also the trailing edges of the pulses of FIG. 3e and, consequently, also those of the gate pulses of FIGS. 3g and 2b are fixed relative to the synchronizing pulses.

Figure 3:
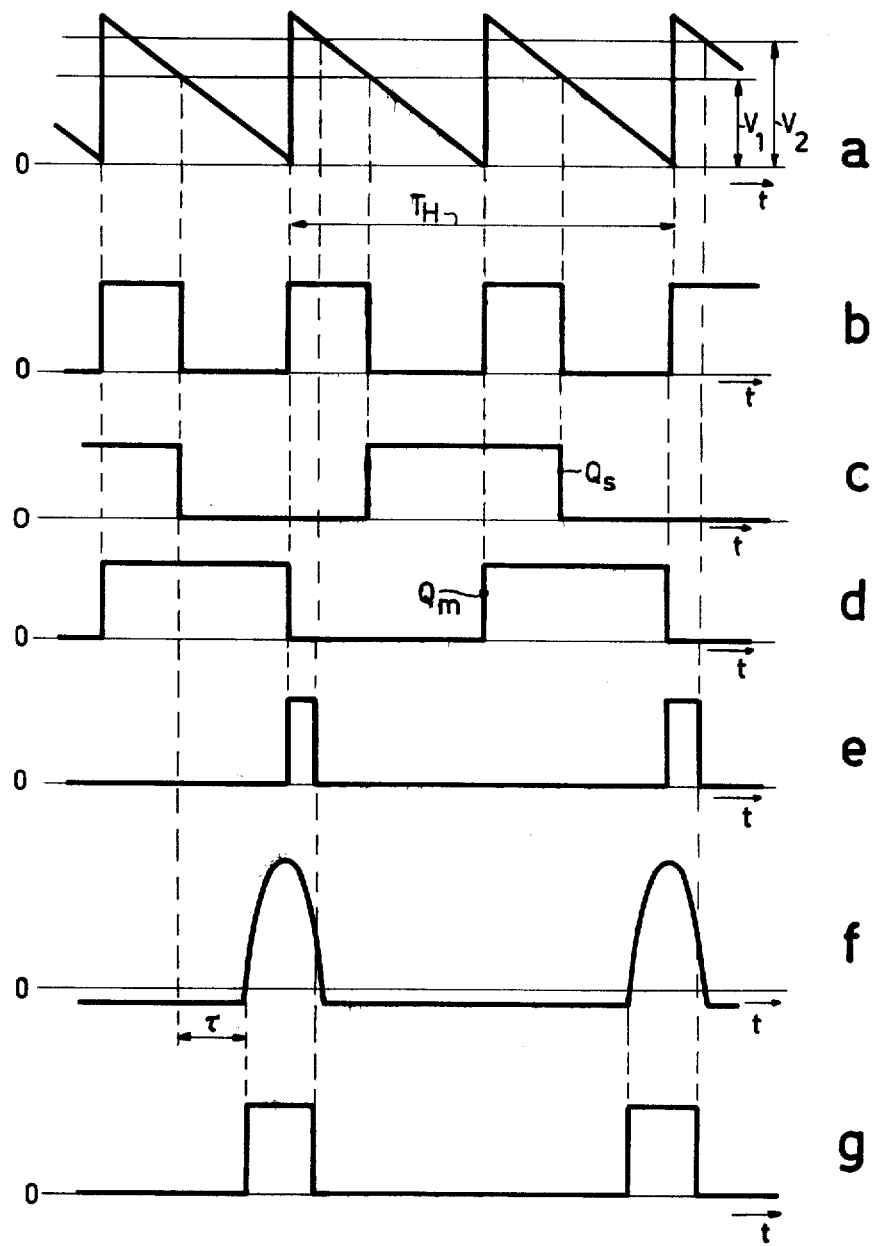

If now the delay τ between the falling edge of the signal of FIG. 3c and the starting instant of the flyback pulse of FIG. 3f vary and/or if a shift of the gate pulses of FIG. 3g occurs relative to the reference signal of FIG. 3d as a result of spread in the properties of the various components and/or of inequalities of the transition times in the various transistors etc., then the pulse generator 7 is so adjusted by the operation of auxiliary control loop 7 to 16 inclusive that the situation shown in FIG. 3d occurs. In this situation the input voltage, originating from filter 15, of differential amplifier 16 is substantially equal to the voltage $V_3$. Prior to the occurrence of this situation, said voltages deviate from one another, so that voltage $V_1$ varies. As a result, the position of the trailing edges of the pulses of FIG. 3b and, consequently, also the position of the edges of the signal $Q_s$ of FIG. 3 c change. Thus, the signal $Q_s$ is shifted along the time axis until the flyback pulses of FIG. 3f are fixed relative to the synchronizing pulses of FIG. 2a. Therefore, it is ensured, by means of the auxiliary control loop, that the influence of variations in time τ are considerably reduced and that the gate pulses shift only a little relative the reference signal, so that they may be of a short duration.

As in the previously mentioned Dutch Patent Application No. 7511633, the d.c. voltage $V_o$, which is supplied to oscillator 5 in the absence of a control voltage originating from filter 4 and cause the oscillator to generate a signal having the nominal frequency, may be derived from the output voltage of filter 15. Also a pulse may be derived from one of the signals of FIG. 2 or FIG. 3, for example the sawtooth signal of FIG. 3a, for keying out the color synchronizing signal, which pulse may also be used for stabilising the black level. A coincidence detector may be used with which it is possible to reinstate the at least partly simultaneous occurrence of the gate pulses and the synchronizing pulses. In the case of non-coincidence, the gate pulses assume a longer duration, or the supply load for the gate pulses to gate 2 is interrupted, while the loop gain of control loop 3 to 8 inclusive is increased. As known, the locking-in property of the loop is improved by means of this switchover.

As this loop gain cannot be infinitely large, the situation shown in FIG. 2 does not as a rule occur, that is to say there always remains a residual error. This means that the edge of the reference signal of FIG. 2c occurs, in the nominal state, at an instant which slightly deviates from instant $t_o$, so that the voltage supplied to oscillator 5 slightly deviates from the value $V_o$. The circuit of FIG. 1 is improved in this respect.

The control voltage which is supplied to oscillator 5 is also supplied to an amplifier 17. The output voltage thereof is the voltage $V_2$ which is supplied to pulse generator 11. Amplifier 17 is so dimensioned that the abovementioned error is corrected. If the error is, for example, such that the falling edge of the signal of FIG. 2c occurs somewhat too early relative to instant $t_o$ then amplifier 17 must have a gain of such a value and such a sign that voltage $V_2$ in FIG. 3a increases by a suitable value. This cause the falling edges in FIG. 3e and, consequently, in FIG. 3g to be shifted to the left. Due to the operation of the auxiliary control loop, when the gate pulses of FIG. 3g are substantially symmetrical in the synchronized state relative to instant $t_o$, the rising edges in FIG. 3g are shifted to the right so that the gate pulses are given a shorter duration. The consequence of the outlined shift is that the flyback pulses occur somewhat later than is the case in FIG. 3f, so that also the signal $Q_s$ of FIG. 3c is shifted to the right. This means an identical shift of the falling edges of the signal of FIG. 3b and, consequently, a decrease of voltage $V_1$. In this manner a small error is introduced in the auxiliary control loop so that the flyback pulses are slightly shifted relative to the reference signal, whose position along the time axis does not depend on voltage $V_1$ but, as a consequence of which, with a suitable design of amplifier 17, the flyback pulses are fixed relative to the synchronizing pulses. The center instant of a flyback pulse thus occurs at instant $t_o$. A certain value can be assigned to voltage $V_2$ in the absence of a control voltage at the input terminal of amplifier 17; the duration of the gate pulses is adjusted by this setting. It will be obvious that a similar adjustment can also be applied in the case amplifier 17 is not present.

The foregoing discusses the idealised wave forms of FIGS. 2 and 3. It is obvious that both the leading and trailing edges in, for example, FIG. 2b and the edges in, for example, FIG. 2c have in practice no infinitely steep slope but a kind of sawtooth shape. Consequently, the symmetry aimed at means that the center instants of the pulses in FIG. 2b and of the edges in FIG. 2c occur substantially simultaneously, wherein center instant must be understood to mean in the first-mentioned case the instant located in the center of the time interval between which the signal is higher than half its maximum value and in the second case the instant at which half of the maximum value is achieved.

During the locking-in of the auxiliary control loop the position of the gate pulses varies in the described circuit along the time axis while that of the reference signal remains unchanged. It is clear that an implementation can be realised in which the position of the gate pulses is not affected by the control, while the position of the reference signal varies.

With the exception of capacitors which are part of filters 4 and 15, the described circuits can be integrated in a semiconductor body. In the preceding the oscillator has in the nominal state double the line frequency. It will be obvious that this is not essential for the invention, that is to say the invention can also be used if the nominal frequency is the line frequency or another multiple thereof.

What is claimed is:

1. A television receiver having a line deflection circuit and a line synchronizing circuit, said line synchronizing circuit comprising a controllable oscillator, a signal derived therefrom being applicable to said line deflection circuit; a pulse generator coupled to said oscillator for deriving pulse-shaped gate signals; a coincidence detector; means for applying said pulse-shaped gate signals and pulse-shaped line synchronizing signals to said coincidence detector; a first phase discriminator coupled to said coincidence detector for determining the phase difference between said line synchronizing signal and a reference signal derived from said oscillator signal; a first low-pass filter for smoothing the output voltage from said first phase discriminator, said controllable oscillator being coupled to said first low-pass filter whereby the output therefrom controls the frequency and/or phase of said controllable oscillator; a second phase discriminator for determining the interval between the center instant of a pulse of said pulse-shaped gate signal and the center instant of an edge occurring in said reference signal; a second low-pass filter for smoothing the output voltage from said second phase discriminator; and means for controlling the center instant of the edge in said reference signal using the output from said second low-pass filter; wherein said line synchronizing circuit further comprises gate means having a first input terminal for receiving the output from said pulse generator and a second input terminal for receiving an output signal from said line deflection circuit, said gate means also having an output terminal for generating the gate pulses for said coincidence detector and said second phase discriminator.

2. A television receiver as claimed in claim 1, wherein said controlling means comprises a differential amplifier for amplifying the difference between the second smoothed voltage and a reference voltage, the time position of an edge of the oscillator signal being controllable by the output signal of the differential amplifier.

3. A television receiver as claimed in claim 1, wherein the time constant of the second low-pass filter is at least ten times smaller than the time constant of the first low-pass filter.

4. A television receiver as claimed in claim 1, wherein the gate means comprises an AND-gate, a first input terminal of which is the second input terminal of the gate means and a second input terminal of said AND-gate is supplied with a signal originating from the controllable oscillator, and an OR-gate, a first input terminal of which is the first input terminal of the gate means and a second terminal of said OR-gate is connected to the output terminal of the AND-gate, the output terminal of the OR-gate being the output terminal of the gate means.

5. A television receiver as claimed in claim 1, wherein said line sychronizing circuit further comprises an amplifier for amplfying the first smoothed voltage, the output voltage of which is supplied to the pulse generator.

6. A television receiver as claimed in any of the preceeding claims, wherein said line synchronizing circuit, with the exception of capacitors forming a part of said low-pass filters, is integrated in a semiconductor body.

* * * * *